(12) United States Patent
Gerstel et al.

(10) Patent No.: US 7,865,078 B2
(45) Date of Patent: Jan. 4, 2011

(54) PROCESSING OF OPTICAL PERFORMANCE DATA IN AN OPTICAL WAVELENGTH DIVISION MULTIPLEXED COMMUNICATION SYSTEM

(75) Inventors: Ornan A. Gerstel, Cupertino, CA (US); Glen P. Koste, Brewster, NY (US)

(73) Assignee: Tellabs Operations, Inc., Naperville, IL (US)

( * ) Notice: Subject to any disclaimer, the term of this patent is extended or adjusted under 35 U.S.C. 154(b) by 0 days.

(21) Appl. No.: 11/747,636

(22) Filed: May 11, 2007

(65) Prior Publication Data
US 2007/0253711 A1 Nov. 1, 2007

Related U.S. Application Data

(63) Continuation of application No. 09/897,948, filed on Jul. 5, 2001, now Pat. No. 7,231,145.

(60) Provisional application No. 60/264,016, filed on Jan. 26, 2001.

(51) Int. Cl.
*H04B 10/08* (2006.01)
(52) U.S. Cl. .............................. 398/17; 398/16; 398/38
(58) Field of Classification Search .................. 398/10, 398/16–17, 33, 38, 94, 138
See application file for complete search history.

(56) References Cited

U.S. PATENT DOCUMENTS

| 5,251,001 | A | 10/1993 | Dave et al. ................. 356/73.1 |
| 5,825,516 | A | 10/1998 | Walsh ......................... 398/40 |
| 5,859,695 | A | 1/1999 | Nelson et al. ............... 356/73.1 |
| 5,943,147 | A | 8/1999 | Vanoli et al. .................. 398/27 |
| 6,134,032 | A * | 10/2000 | Kram et al. ................... 398/17 |
| 6,304,347 | B1 | 10/2001 | Beine et al. ................... 398/38 |
| 6,317,231 | B1 * | 11/2001 | Al-Salameh et al. .......... 398/34 |
| 6,937,821 | B1 | 8/2005 | Heath et al. ................... 398/38 |
| 2001/0021045 | A1 | 9/2001 | Tervonen et al. ............ 359/110 |
| 2002/0114608 | A1 | 8/2002 | Maroney et al. ............ 385/147 |

FOREIGN PATENT DOCUMENTS

EP 0 821 224 A2 1/1998

* cited by examiner

*Primary Examiner*—Dzung D Tran
(74) *Attorney, Agent, or Firm*—Fitzpatrick, Cella, Harper & Scinto (57) ABSTRACT

Optical performance measurements are taken in an optical network and displayed in a form that allows an operator to enter fault information related to the measurements, or to automatically generate fault alarms to the operator, based on processing of the measurements. The optical measurements may be individual power measurements taken for each lightpath at various points in each node it traverses, such as amplifiers, multiplexers/demultiplexers or at an interface with another node.

20 Claims, 7 Drawing Sheets

PROCESSING OF OPTICAL PERFORMANCE DATA IN AN OPTICAL WAVELENGTH DIVISION MULTIPLEXED COMMUNICATION SYSTEM

This application is a continuation of U.S. patent application Ser. No. 09/897,948, filed Jul. 5, 2001, which claimed priority under 35 U.S.C. § 119(e) to U.S. Provisional Patent Application No. 60/264,016, filed Jan. 26, 2001. Both of those applications are incorporated by reference herein in their entireties, as if frilly set forth herein.

FIELD OF THE INVENTION

The invention is in the field of Optical Telecommunications, and more particularly, pertains to correlating optical measurements in an optical network to other events occurring in the network.

BACKGROUND OF THE INVENTION

In all-optical networks it is difficult to localize faults and signal degradations due to the analog nature of optical power measurements throughout the optical network.

SUMMARY OF THE INVENTION

In one aspect of the invention optical measurements in an optical network are correlated to other events occurring in the optical network to localize network faults.

In another aspect of the invention optical measurements in an optical network are compared with complex threshold functions to localize network faults.

In yet another aspect of the invention baseline power measurements generated from a set of network nodes are stored, and then compared with current power measurements for the respective nodes, and if the difference between the baseline power measurement and the current power measurement is significant, a notification is generated to an operator, or the resultant problem is indicated in graphical fashion on a display.

In still another aspect of the invention alarm notifications for an optical light-path are computed based on comparing optical parameters to thresholds that vary as a function of hops from a source node to a destination node based on a power measurement point at each hop.

In a further aspect of the invention alarm notification for an optical light-path are computed based on comparing optical parameters to threshold values that vary as a function of hops from a destination node to a source node based on a power measurement point at each hop.

In yet a further aspect of the invention faults in an optical network are localized by comparing a pair of power measurement curves for the network as a function of time and correlating a problem in one to a change of values in the other.

DETAILED DESCRIPTION

The invention is directed to methods of processing optical performance measurement in an optical network, displaying the measurements in a form that allows an operator to enter fault information related to the measurements, or to automatically generate fault alarms to the operator, based on processing of the measurements.

The optical measurement may be individual power measurements taken for each light-path at various points in each node it traverses, such as amplifiers, multiplexers/demultiplexers or at an interface with another node.

It is noted that the individual power measurements cannot be compared to a fixed threshold below which they are considered faulty, since a given low power level may be acceptable at a destination node, whereas the same given low power level may be indicative of a fault at a source node.

A number of methods of determining whether or not a power measurement in an optical network indicates a fault are set out below.

When the optical network is in a stable and healthy condition, a baseline power measurement is taken (this can be done automatically or based on a user's command). All subsequent power measurements are compared to the baseline power measurements and a significant drop in power from the baseline power measurement indicates a fault.

Figure 1:
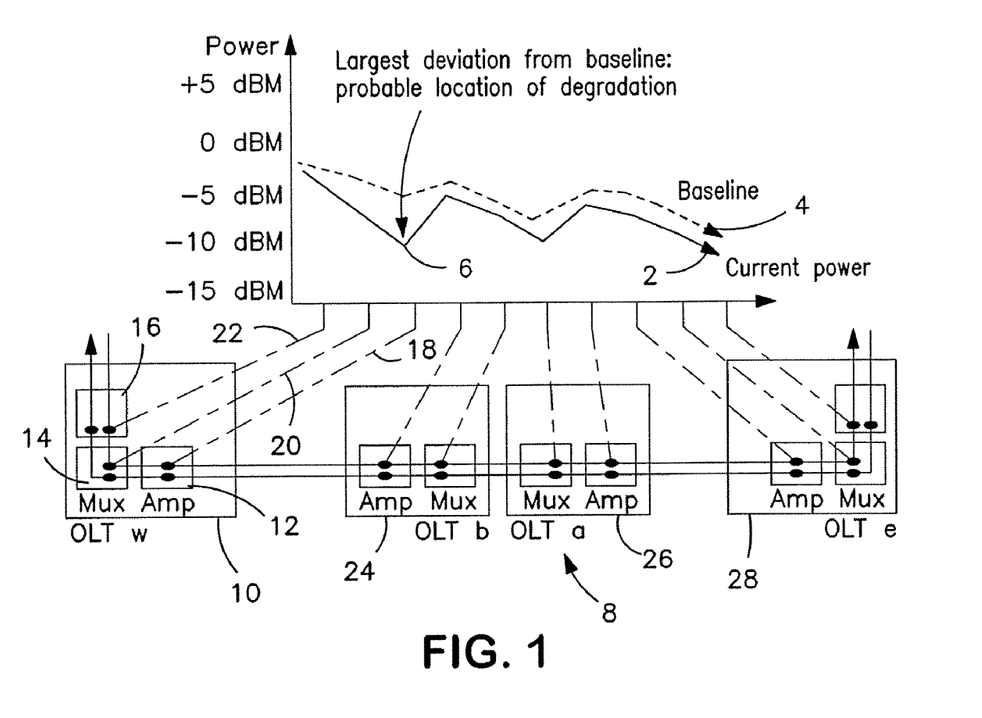
FIG. 1 illustrates all power monitoring points along a light-path in an optical network at a fixed point in time.

FIG. 1 is directed to a power measurement technique based on a baseline power measurement taken at some historical point in the lifetime of a given light-path. The baseline power measurement is initiated either automatically, as part of light-path verification, or manually by an operator. The current Power Measurement (PM) values (solid line 2) are compared to baseline PM values (dotted line 4) in the graph FIG. 1, and the suspected point of degradation is where the change from the baseline power measurement is greatest, in this instance the point 6.

The power measurement points are in respective nodes in an optical network 8, including a node 10 comprising an amplifier 12, a multiplexer 14 and an interface device 14, with the dotted lines 18, 20 and 22 indicating where the respective power measurements are plotted on the graph of FIG. 1. Optical nodes 24, 26 and 28 include similar power measurement points, with the respective measured power also being plotted on the graph.

Another method of determining network faults is to utilize a threshold system that takes into account the number of hops from the source of a light-path and the point within the node where the power measurement point was taken. The farther away from the source node, the greater is the dynamic range between the low and high thresholds to account for component variations. This method utilizes a min/max allowable power level of a light-path at a certain monitoring point, which depends on:
1. The number of hops the light-path has traversed from the transmitter; the farther away from the transmitter (source node) to the receiver (destination node), the wider is the allowable range of power, due to the 3 sigma accumulation of statistical variations.
2. The device (amp, mux/demux, etc.) in the node at which the power is monitored. It is noted that the power at the channel mux is lower than the power right after the amp by a number of dBs.

Figure 2:
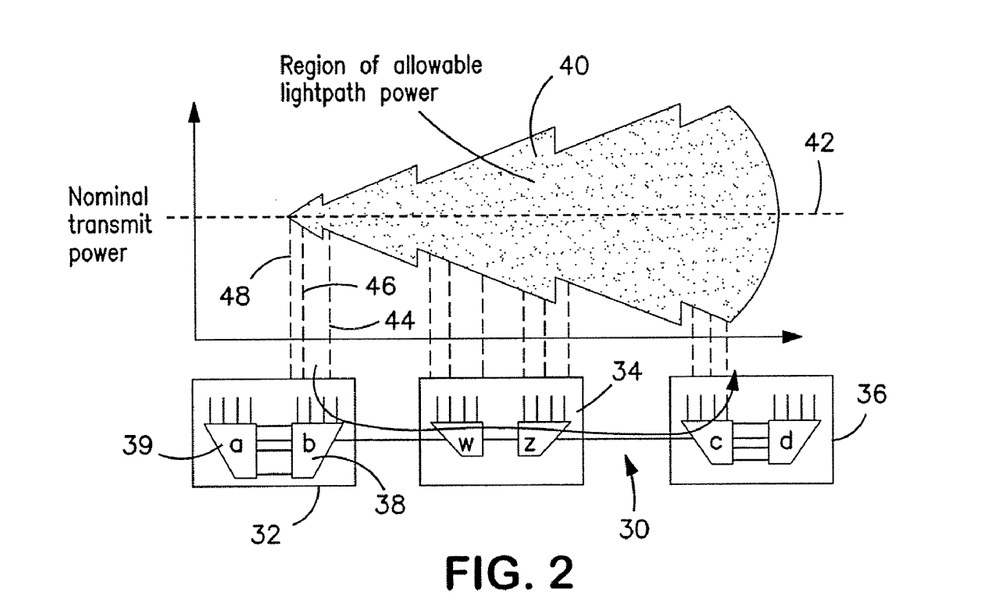
FIG. 2 illustrates the power threshold along a route of a light path in an optical network from a source node to a destination node.

In FIG. 2 an optical network 30 includes optical nodes 32, 34 and 36 each including Optical Line Terminals (OLTs) connected back-to-back.

The graph included in FIG. 2 illustrates a region of allowable light-path power 40 centered on a nominal transmit power level 42. Dotted lines 44, 46 and 48 show where measurement points in OLT 38 of optical node 32 are plotted on the graph of FIG. 1. This shows positions of crossing an upper/lower power threshold, and provides a source of information of a graphical representation of where the power fault or problem occurred. It is understood that the graphical representation is information which is displayable on a display device or printable on a printer.

It is noted that the higher the signal rate in the optical network 30, the more intolerant the signal is to power changes. Thus, some tweaking of tolerance measurements should be supported. That is, does the optical network assume more stringent or more relaxed thresholds?

Figure 3:
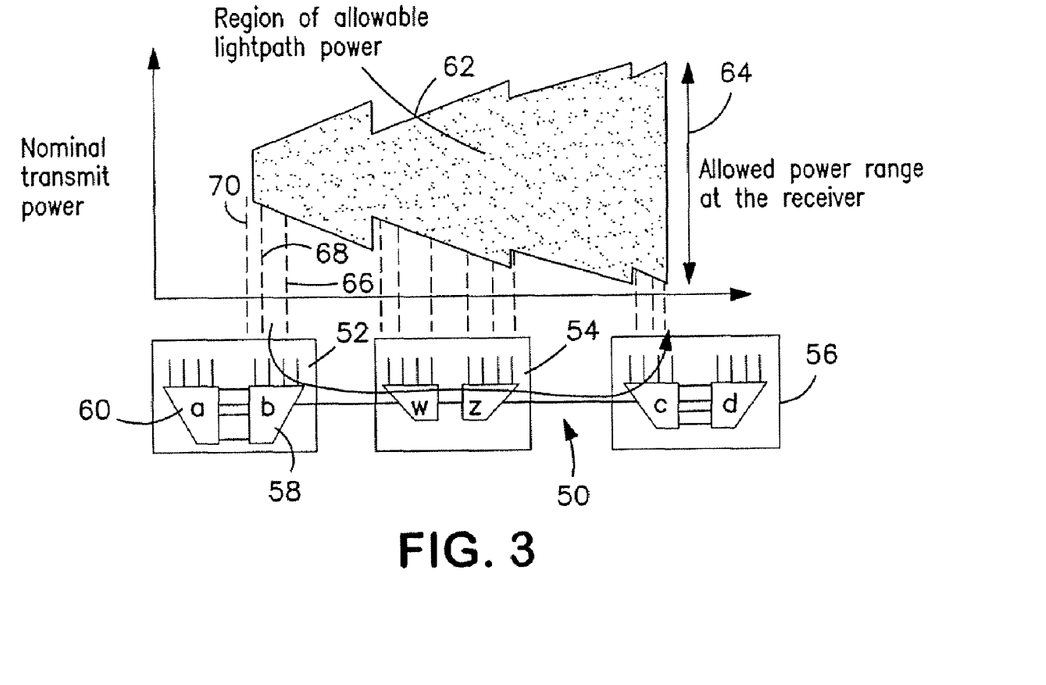
FIG. 3 illustrates optical power threshold values along a light-path route in an optical network from a destination node to a source node.

In FIG. 3 an optical network 50 includes optical nodes 52, 54 and 56 each including OLTs 58 and 60 connected back-to-back.

The graph included in FIG. 3 illustrates a region of allowable light-path power 62 having an allowed power range 64 at the receiver. Dotted lines 66, 68 and 70 show where measurement points in OLT 58 of optical node 52 are plotted on the graph of FIG. 3. This shows positions of crossing an upper/lower power threshold, and provides a source of information of a graphical representation of where the power fault or problem occurred. It is understood that the graphical representation is information which is displayable on a display device or printable on a printer.

The method of FIG. 3 is very similar to the method of FIG. 2, differing only in that the number of hops is measured in the reverse direction, back from the destination node of the light-path to the source node. This allows the optical power to fluctuate as much as possible, as long as it is received in the acceptable power range of the receiver. Thus, if this method produces a threshold crossing notification, it indicates the location along a light-path where the problem occurs, whereas the method of FIG. 2 is best for warning that a card in a node doesn't meet specifications.

Each of the methods discussed above are used to determine the temporal correlation between different measurements. That is, a very important capability for PM is to co-locate (or super-impose) a pair of monitored values on the same time axis. This allows focusing on one analog power monitoring point somewhere along the light-path, and to see how a power change affected coding violations at the receiver side of the light-path. The importance of this function lies in the fuzzy nature of power readings, which unless correlated to a digital performance indication may be found to be not sufficiently conclusive.

The power measurements are used as displayable information such as the following:

1. A pair of measured power values sharing a common X-axis.
2. The difference between the pair of power measurements (a delta curve).
3. A set of power measurements along a route of a light-path (path-driven), whereby the time of the power measurements is taken from a time driven graph of a different power measurement.

The allowed operations for the power measurements are the following:
1. Choose the two power values to be displayed. Note that they can pertain to the same light-path or to two different light-paths. Also, they can share the same measurement units (e.g. optical power) or have different units (e.g., optical power and significant time errors).
2. Choose the display method; time-driven or path-driven.
3. Choose a path-driving measurement graph based on a time point as indicated on a different time-driven graph.

Figure 4:
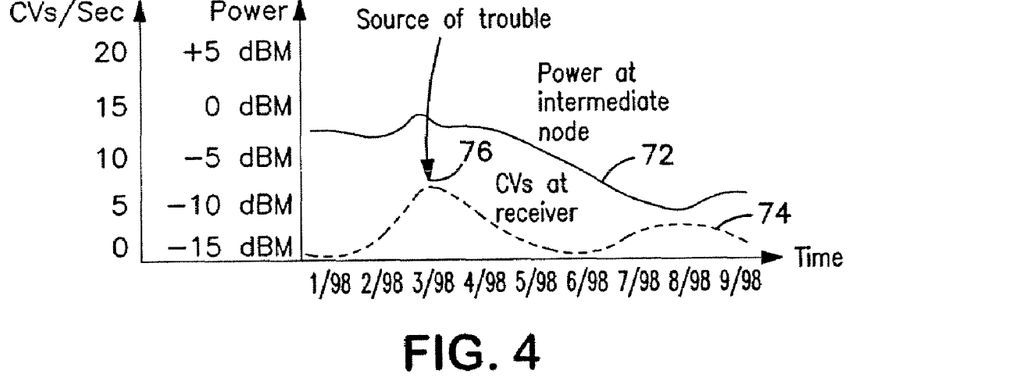
FIG. 4 is a graph of co-location of one monitoring point with another monitoring point in an optical network.
Figure 5:
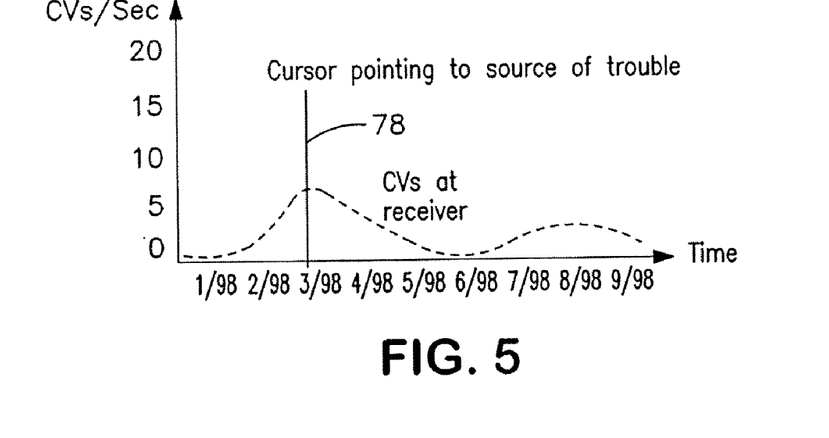
FIG. 5 is a graph for localizing an optical fault as a function of time.

Examples of the allowed operations are shown in the graphs of FIGS. 4 and 5.

In the graph of FIG. 4 an example of a correlation between a pair of power measurements is shown. That is, a co-location of a single power monitoring point with another power monitoring point. During a time span of months from 1/98 to 9/98 power 72 at an intermediate node in an optical network is measured, and power 74 at a receiver is measured. A source of trouble 76 is found to occur at 3/98.

In the graph of FIG. 5 an example of choosing a power measurement graph based on a point in time in months is shown. In a first step, a point in time 3/98 is chosen where a chosen value (CV) count spikes up as shown by a cursor 78 pointing to a source of trouble. In step 2, a measurement value is chosen to be displayed, such as the optical power of the appropriate or a given channel. In a step 3 a path-driven curve of the CV at the time chosen in step 1 is generated.

Figure 6:
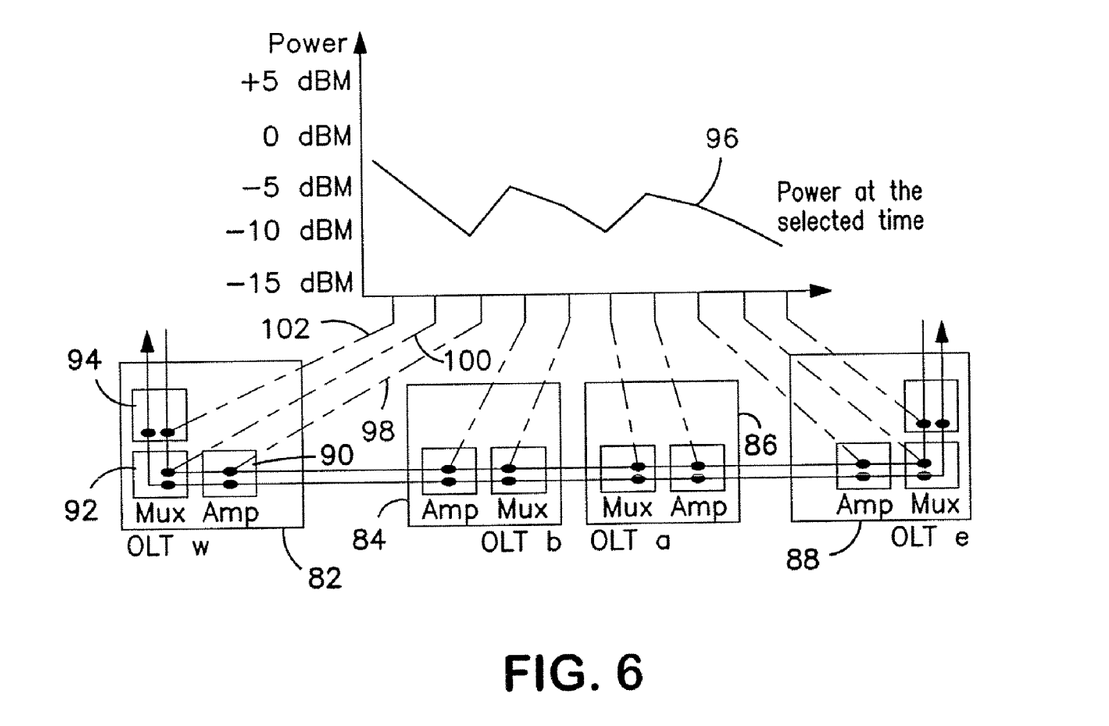
FIG. 6 illustrates the change in power with respect to time in an optical network.

Moving the cursor 78 in FIG. 5 will change the path-driven graph generated for an optical network. For example, for the optical network 80 of FIG. 6, which includes OLTs 82, 84, 86 and 88, with each OLT including an amplifier 90, a multiplexer 92 and an interface device 94, moving the cursor 78 as in FIG. 5 generates power 96 at a selected time, for example 3/98, by measuring power in the respective OLTS. For example, power levels in OLT 82 are measured and displayed on the graph of FIG. 6, as indicated by the dotted lines 98, 100 and 102.

Figure 7:
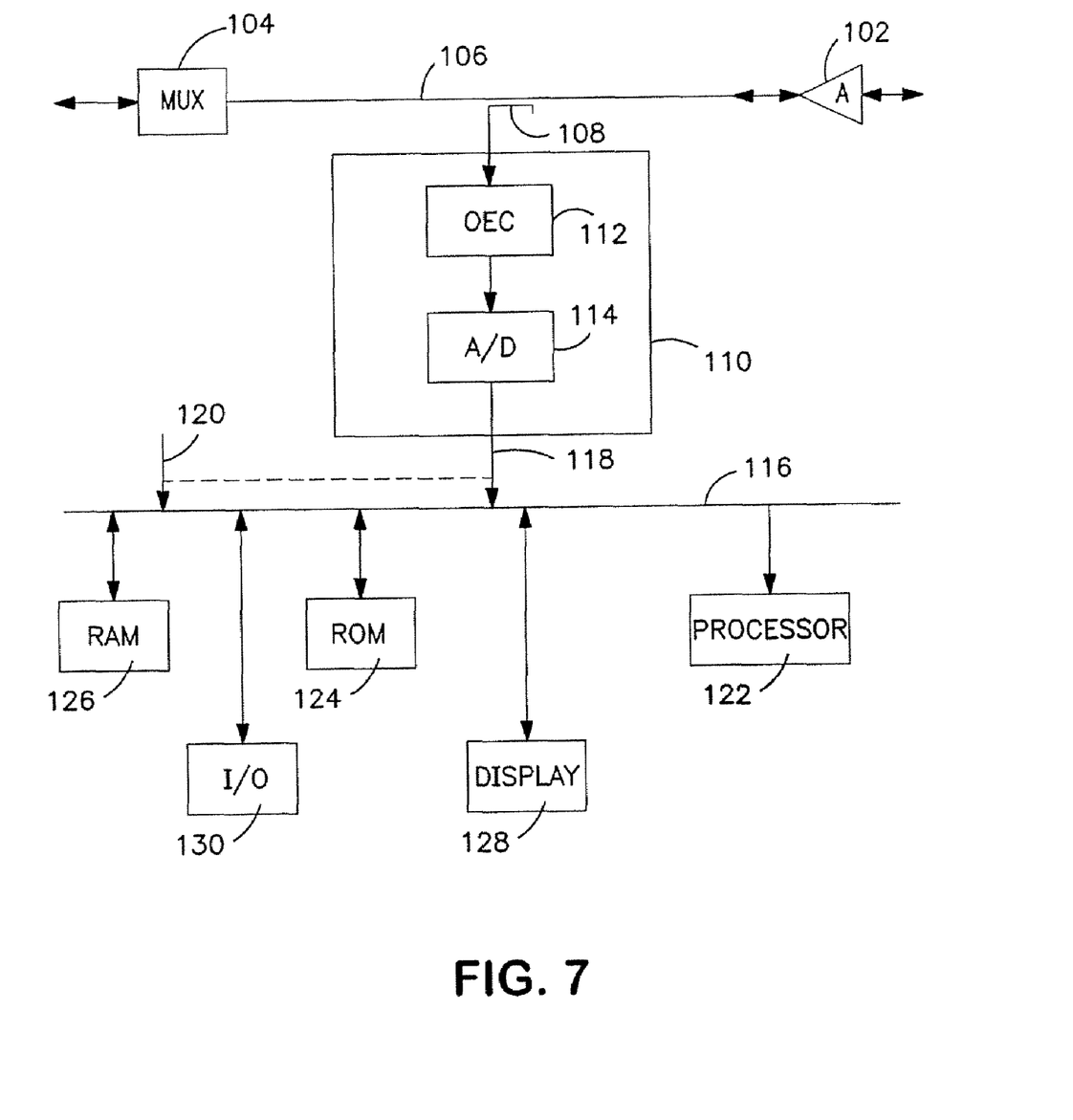
FIG. 7 is a block diagram of a power measuring system according to the invention.

FIG. 7 is a block diagram of a power measuring system for a given node in an optical network, which node includes an optical amplifier 102 and a multiplexer 104 connected by an optical fiber 106. An optical coupler 108 taps off on the order of 5% of the optical signal from the optical fiber line 106 and provides that signal to a power measuring circuit 110 which includes an optical-electro converter 112 which is connected to the optical coupler 108. The converter 112 converts the optical signal to an electric current. The electric current from the converter 112 is provided to an A/D converter and power measurement device 114 which measures the power of the digital value of the current. The measured power is then provided to a bus 116 by a line 118 for determining if the measured power is within predetermined limits, according to any of the three methods of power measuring according to the invention, which are set out below.

Also connected to the bus 116 is a processor 122 for processing the measured power signals from the power measuring device 110, and corresponding power measurements from other predetermined points at other nodes in the network from other power measurement input lines 120. Also included is a ROM 124 for storing measured power values, and a RAM 126 storing different programs for determining if power measurements at predetermined points at given nodes in an optical network are within predetermined limits. Further included is a display device 128 which displays data indicative of whether points at predetermined nodes are within acceptable power ranges. Also included is an input/output device 130 wherein an operator can input and output information to the system, and to request display of certain data on the display device 128.

Figure 8:
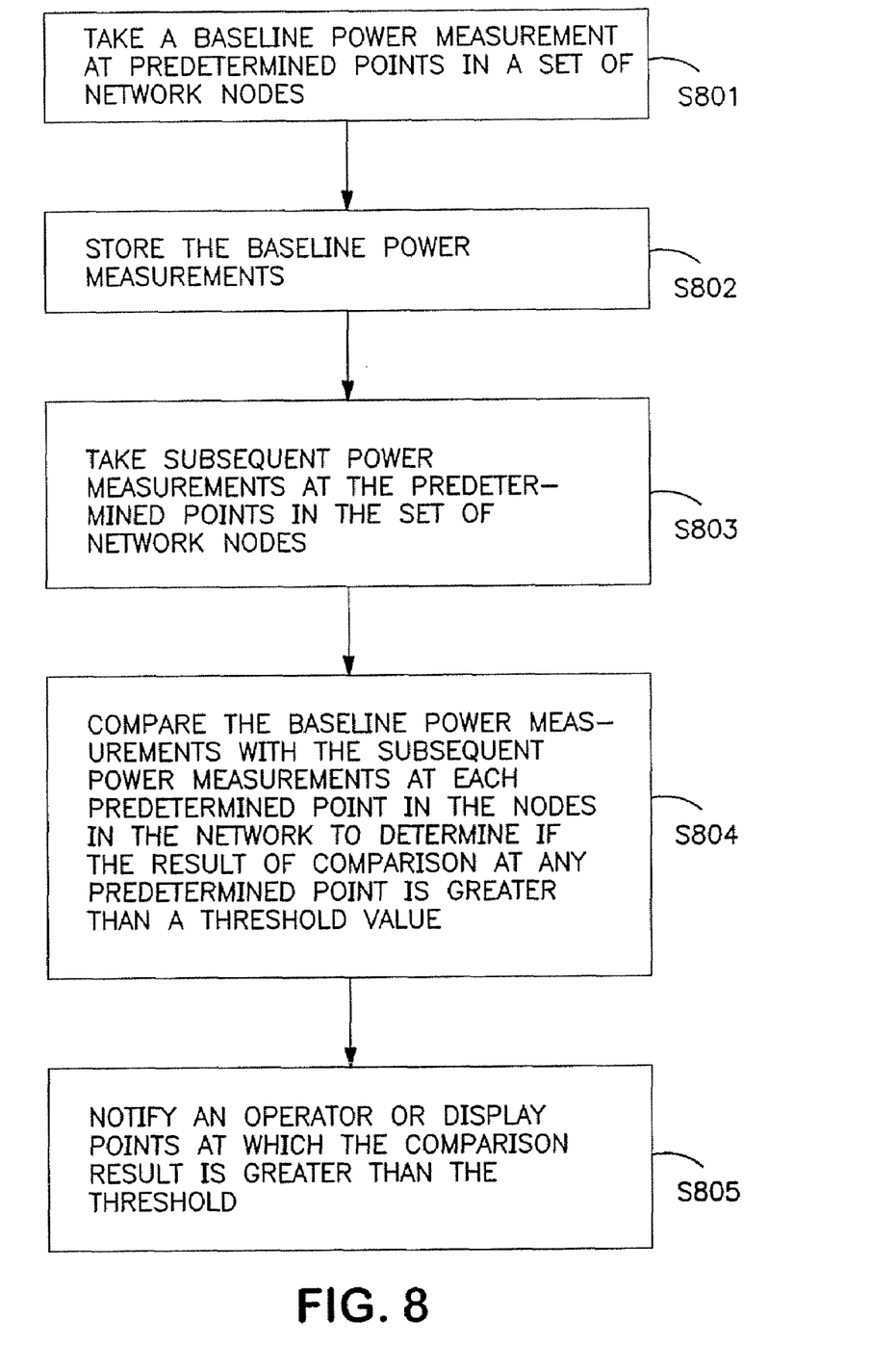
FIG. 8 is a flow chart of a power measuring method for a first embodiment of the invention.

FIG. 8 is a flow chart for the power measuring method of the first embodiment of the invention shown in FIG. 1. The program for this power measuring method is stored in the RAM 126 (FIG. 7). In step S801 a base line power measurement is taken at predetermined points in a set of network nodes. For example, such as the point at the output of the amplifier 102 on fiber optic line 106 as shown in FIG. 7. In step S802 the base line power measurements are stored in the ROM 124 (FIG. 7). At step S803 subsequent power measurements are taken at the same predetermined points in the set of network nodes. Then, at step S804 the stored baseline power measurements are compared with the subsequent power measurements at each of the predetermined points in the network nodes to determine if the result of comparison at any predetermined point is greater than a threshold value. At step S805 an operator is notified, or points are displayed, by indicia indicating which comparison result is greater than the threshold value.

Figure 9:
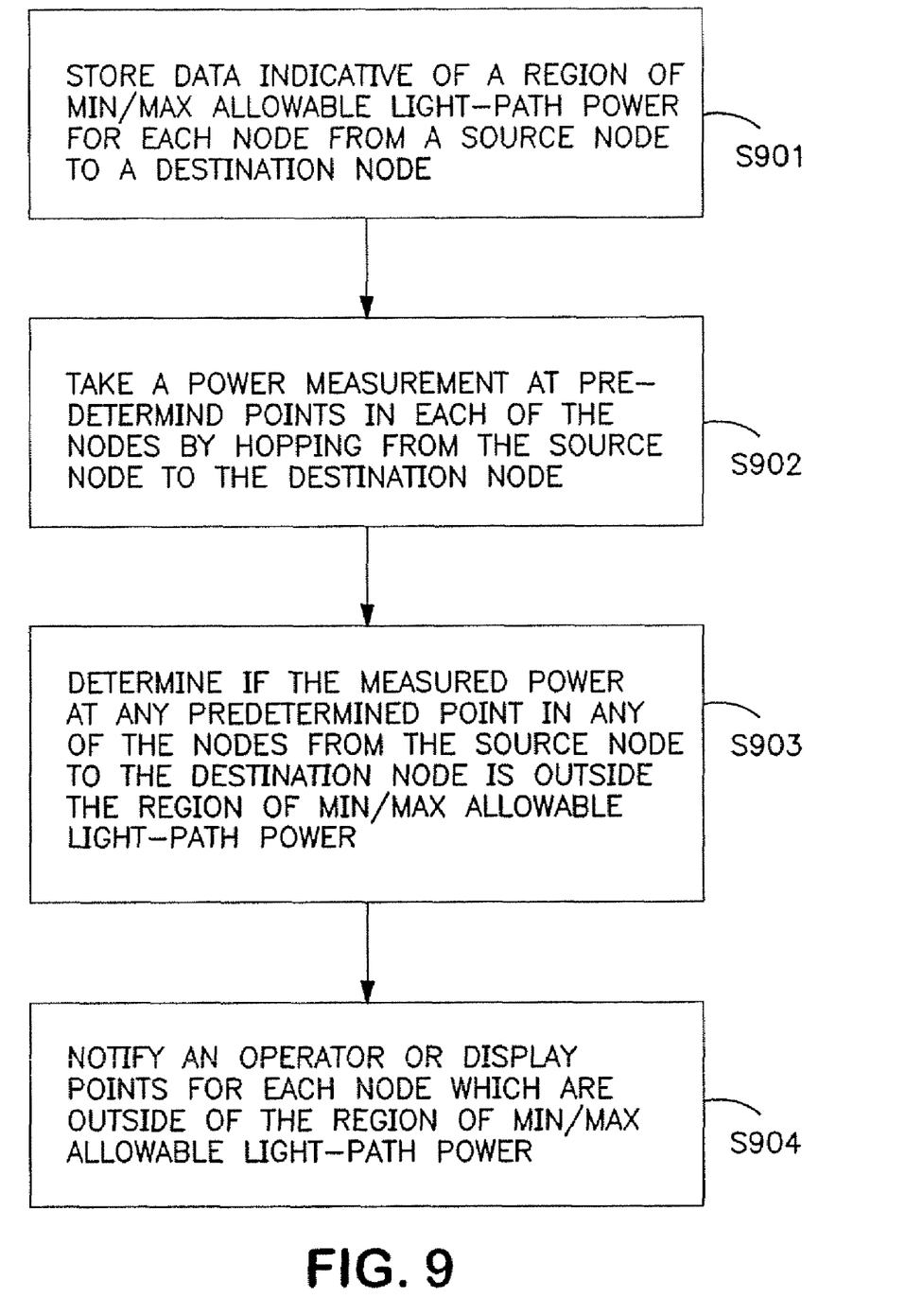
FIG. 9 is a flow chart of a power measuring method for a second embodiment of the invention.

FIG. 9 is a flow chart of a power measuring method for the second embodiment of the invention corresponding to FIG. 2. The program for this power measuring method is stored in the RAM 126 (FIG. 7). At step S901 data indicative of a region of min/max allowable light power for each node from a source node to a destination node is stored in the ROM 124. At step S902 power measurements are taken at predetermined points in each of the nodes by hopping from the source node to the destination node. In step S903 a determination is made as to whether the measured power at any predetermined point in any of the nodes from the source node to the destination is outside the region of min/max allowable light path power. In step S904, indicia indicative of points in each node which are outside the region of min/max allowable light power, are notified to an, operator, or the points are displayed on the display device 128.

Figure 10:
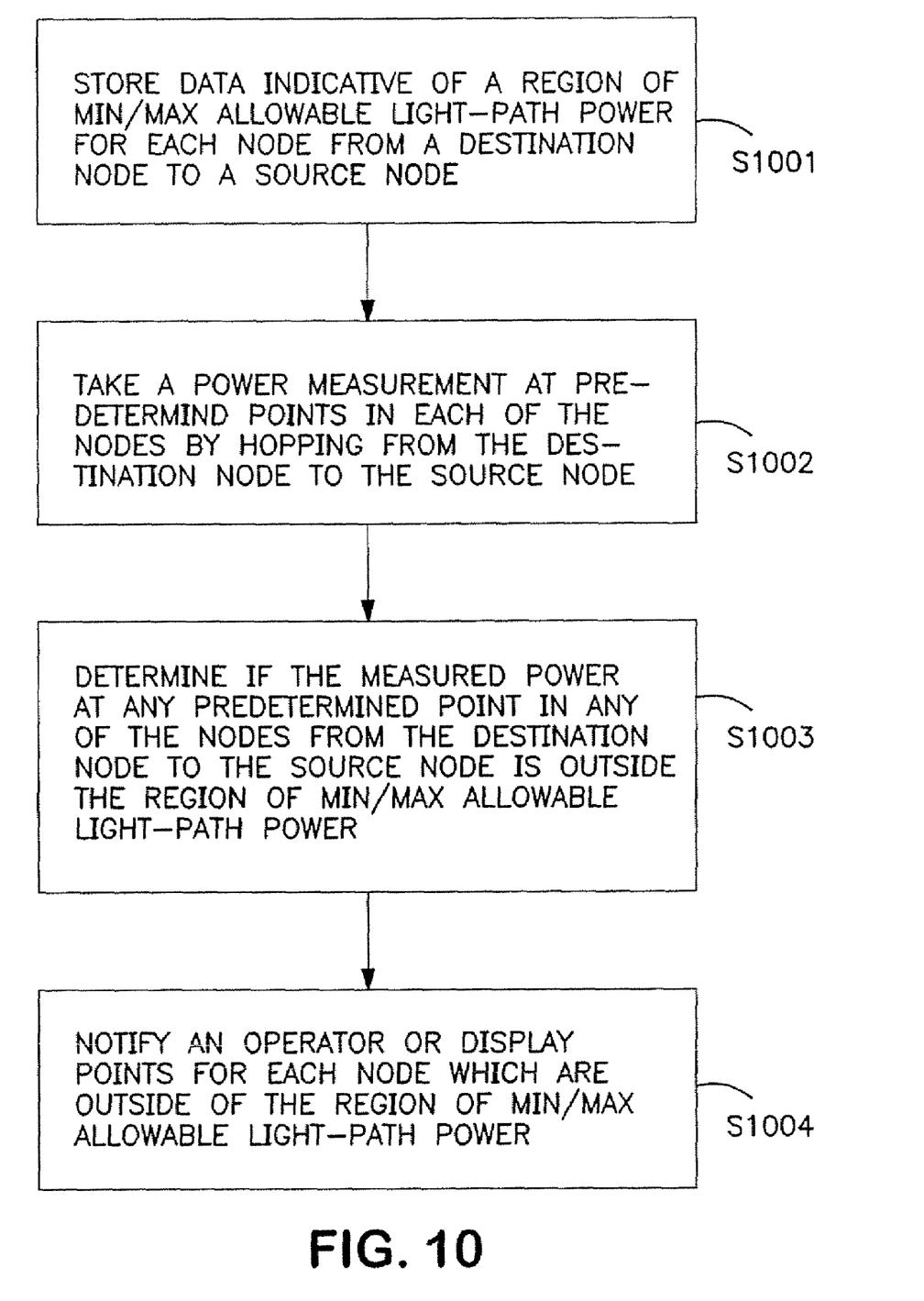
FIG. 10 is a flow chart of a power measuring method for a third embodiment of the invention.

FIG. 10 is a flow chart of a power measuring method for a third embodiment of the invention corresponding to FIG. 3. The program for this power measuring method is stored in the RAM 126 (FIG. 7). In step S1001 data indicative of a region of min/max allowable light path power for each node from a destination node to a source node is stored in the RAM 124. At step S1002 power measurements are taken at predetermined points in each of the nodes by hopping from the destination node to the source node. In step S1003 a determination is made if the measured power at any predetermined point in any one of the nodes from the destination node to the source node is outside the region of min/max allocable light path power. In step S1004 indicia indicative of points in each node which are outside of the region of min/max allowable light power are notified to an operator, or the points are displayed on the display 128.

In summary, methods of processing optical performance measurements in an optical network, displaying them in a form that allows an operator to enter fault information related to the measurements, or to automatically generate fault alarm signals to the operator, based on processing of the measurements have been described.

What is claimed is:

1. An apparatus for detecting faults in a network, comprising:
   a communication interface arranged to receive separate baseline power measurements taken at a plurality of corresponding predetermined points in each separate one of a plurality of nodes of the network, and to receive subsequent power measurements taken at the plurality of predetermined points in each separate one of the nodes of the network; and
   a controller coupled to the communication interface, and being operable to (a) compare the baseline power measurements for the predetermined points in each separate one of the nodes with corresponding ones of the subsequent power measurements taken at corresponding ones of the predetermined points, and (b) detect a fault in the network by determining which comparison result indicates a greatest difference, rather than a substantially exact match, between a baseline power measurement and a corresponding subsequent power measurement, wherein baseline power measurements in each separate node vary in correlation with locations of corresponding ones of the predetermined points.

2. The apparatus according to claim 1, wherein the controller also is operable to provide an indication of a comparison result being greater than a threshold value at any predetermined point in the nodes.

3. The apparatus according to claim 2, wherein the indication indicates predetermined points in the nodes for which the comparison result is greater than the threshold value.

4. The apparatus according to claim 2, wherein the predetermined points include at least one of an amplifier, a multiplexer, and an interface device.

5. The apparatus according to claim 2, further comprising an output user-interface arranged to present the indication to a user.

6. The apparatus according to claim 2, further comprising a display arranged to output the indication.

7. An apparatus according to claim 1, wherein each predetermined point is located at least a respective one of the plurality of nodes, each node comprising at least one of a multiplexer, amplifier, and an interface device.

8. An apparatus according to claim 1, further comprising a memory storing a program, wherein the controller operates under the control of the program.

9. An apparatus according to claim 1, further comprising an A/D converter arranged to convert the power measurements into digital form.

10. An apparatus according to claim 9, further comprising a optical-to-electrical converter arranged to convert the power measurements from optical to electrical form.

11. A system, comprising a plurality of apparatuses for detecting faults in a network, each apparatus being an apparatus according to claim 1 and being located at a respective one of the nodes.

12. A method for detecting faults in a communication network, the method comprising:
   monitoring at least one predetermined operating condition at a plurality of predetermined points in each separate one of a plurality of nodes of the network; and
   detecting a fault in the network by determining a greatest difference, rather than substantially an exact match, in value between an operating condition monitored at separate times at the same points of the plurality of predetermined points, wherein the operating condition in each separate node varies in correlation with locations of corresponding ones of the predetermined points.

13. The method according to claim 12, wherein the monitoring includes measuring optical power at the plurality of predetermined points.

14. The method according to claim 12, further comprising presenting a result of the determining to a user.

15. The method according to claim 12, wherein the predetermined points are included in at least one communication path of the network.

16. A method according to claim 12, wherein each predetermined point is located at least a respective one of the plurality of nodes, each node comprising at least one of a multiplexer, amplifier, and an interface device.

17. A computer-readable memory having stored thereon sequences of instructions for detecting faults in a communication network, the sequences of instructions including instructions which, when executed by a computer, cause the computer to perform:

monitoring at least one predetermined operating condition at a plurality of predetermined points in each separate one of a plurality of nodes of the network; and detecting a fault in the network by determining a greatest difference, rather than substantially an exact match, in value between an operating condition monitored at separate times at the same points of the plurality of predetermined points, wherein the operating condition in each separate node varies in correlation with locations of corresponding ones of the predetermined points.

18. memory according to claim 17, wherein each predetermined point is located at least a respective one of the plurality of nodes, each node comprising at least one of a multiplexer, amplifier, and an interface device.

19. A memory according to claim 17, wherein the monitoring includes monitoring optical power.

20. The memory according to claim 17, wherein the predetermined points are included in at least one communication path of the network.

* * * * *